United States Patent [19]

Bullock

[11] Patent Number: 5,011,347
[45] Date of Patent: Apr. 30, 1991

[54] UNIVERSAL WHEEL RESTRAINING CLEAT AND STRAP ASSEMBLY FOR WHEEL CHOCKS

[75] Inventor: Robert L. Bullock, Antioch, Ill.

[73] Assignee: Standard Car Truck Company, Park Ridge, Ill.

[21] Appl. No.: 443,244

[22] Filed: Nov. 29, 1989

[51] Int. Cl.$^5$ .................. B60P 3/077; B60P 3/075
[52] U.S. Cl. .......................... 410/9; 410/10; 410/20; 410/30
[58] Field of Search ............ 410/3, 4, 7–12, 410/16, 19, 20, 21, 23, 30, 47, 49, 50; 152/221–223

[56] References Cited

U.S. PATENT DOCUMENTS

| | | |
|---|---|---|
| 1,131,477 | 3/1915 | Crofoot .................... 410/4 |
| 1,279,397 | 9/1918 | Michod . |
| 2,023,971 | 12/1935 | Otis . |
| 2,078,700 | 4/1937 | Tobin .................. 410/19 X |
| 2,772,064 | 11/1956 | Cole ..................... 410/47 |
| 3,481,627 | 12/1969 | Felburn .................. 410/50 |
| 3,753,407 | 8/1973 | Tilseth .................. 410/50 X |
| 4,207,939 | 6/1980 | Motosko ................ 152/221 |
| 4,668,140 | 5/1987 | Blunden ................. 410/10 |
| 4,786,223 | 11/1988 | Crissy et al. ............ 410/20 |
| 4,836,726 | 6/1989 | Robertson et al. ......... 410/9 |

Primary Examiner—Frank E. Werner
Assistant Examiner—Brian K. Dinicola
Attorney, Agent, or Firm—Lloyd L. Zickert

[57] ABSTRACT

A wheel restraining cleat and strap for use with a pair of wheel chocks to anchor a vehicle wheel to a supporting surface such as a floor of a railway car for transporting vehicles, which includes a strap of flexible material for overlying the tire of the vehicle wheel and carrying thereon a cleat formed of a material having both flexibility and resiliency so that it grabs the tire to retain the strap in overlying relation with the wheel. The cleat includes protuberances on the tire-engaging side to prevent slippage between the tire and the cleat, thereby maintaining the strap in overlying tie-down relation to the wheel. The cleat is sufficiently bendable to conform to surfaces of tires of different diameters.

11 Claims, 3 Drawing Sheets

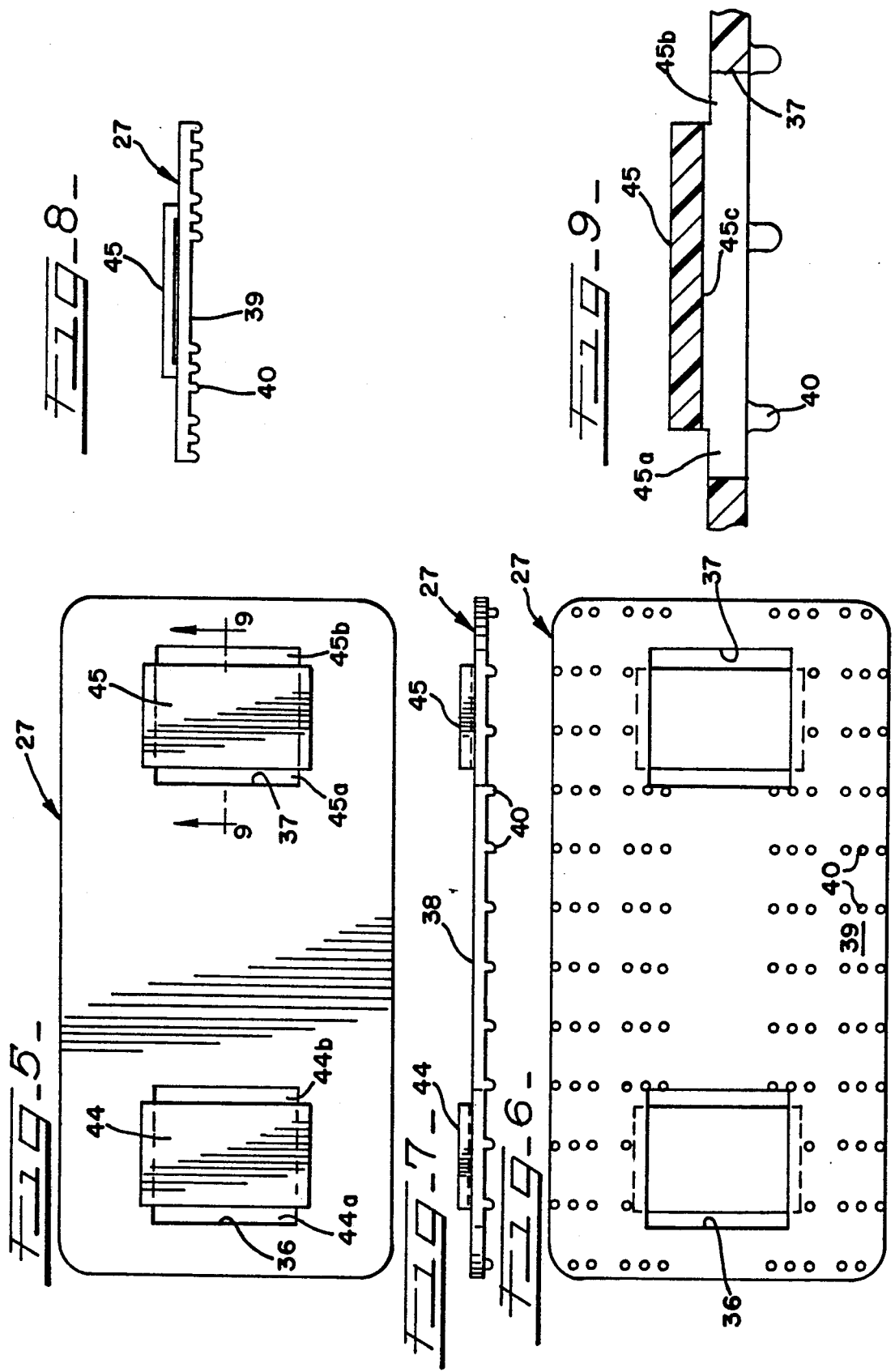

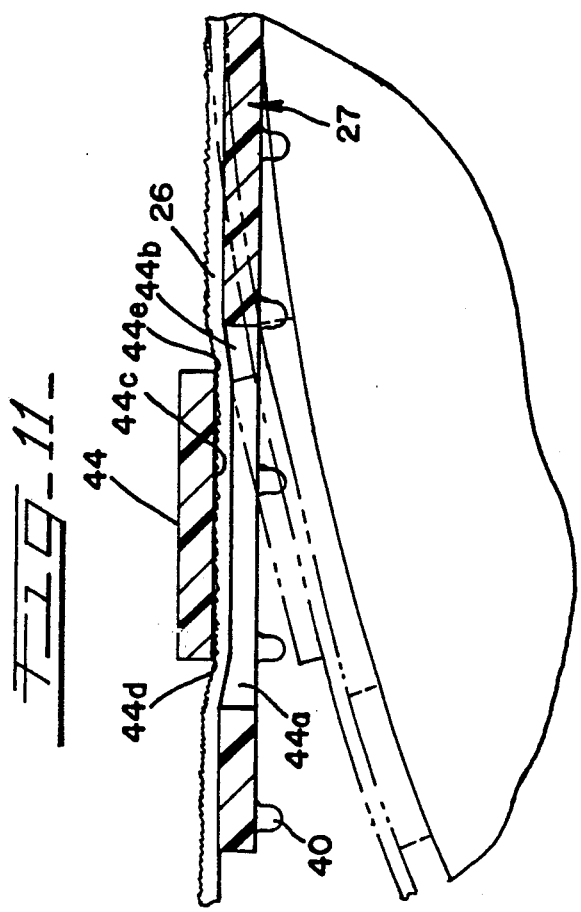
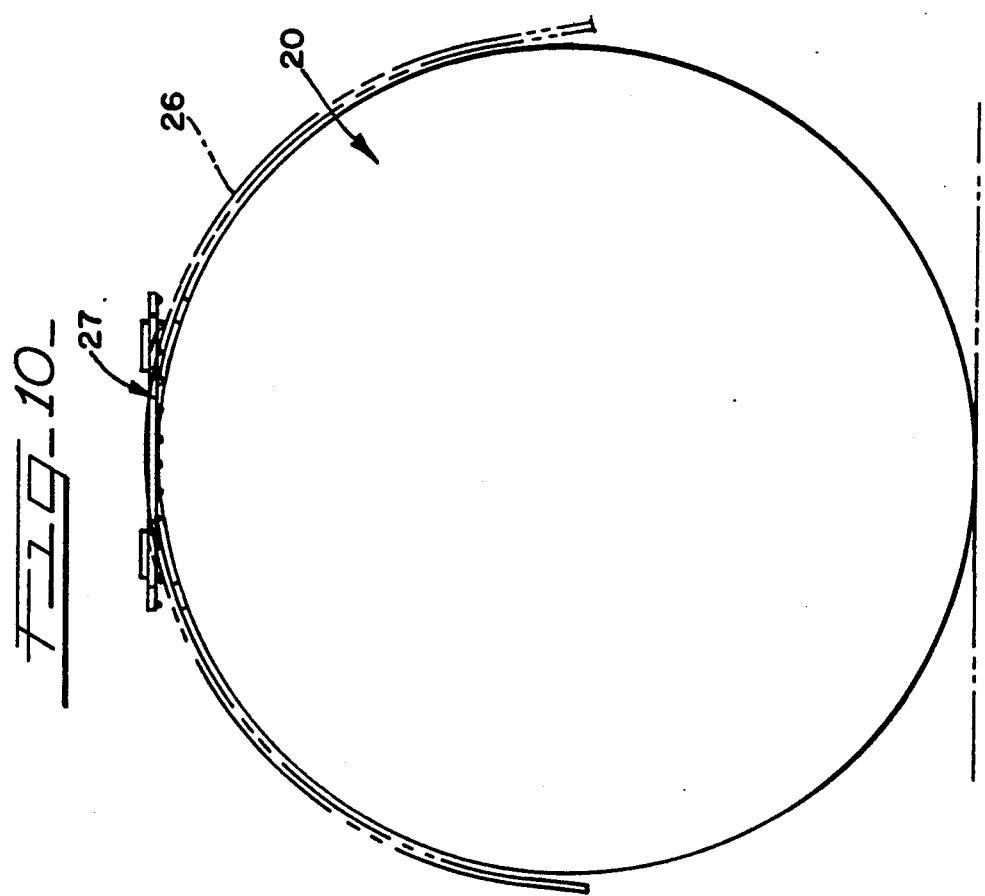

UNIVERSAL WHEEL RESTRAINING CLEAT AND STRAP ASSEMBLY FOR WHEEL CHOCKS

DESCRIPTION

This invention relates in general to a wheel-restraining cleat and strap assembly for wheel chocks used to inhibit movement of a vehicle being transported by rail car, and more particularly to a cleat and strap assembly where the cleat is made of a high-strength resilient material and includes a roughened tire-engaging surface to prevent slippage when secured in place in overlying relation to the tire, and still more particularly to a cleat structure that coacts with a strap so that the cleat can substantially take the shape of the tire and be equally effective for tires of different sizes.

BACKGROUND OF THE INVENTION

Heretofore, it has been well known to utilize a harness with a pair of chocks used to hold a vehicle in a position for transport by rail car where the harness fits over the vehicle wheel and tire to secure the wheel and tire to the chocks that are in turn secured to the floor of the car. These harnesses have been in many forms. One form includes straps or webs of fabric which include parts going over the tire as well as along the side walls of the tires, and include metal D-rings that interconnect strap parts which then are in turn connected by strap members to the wheel chocks. Multiple sewing or fastening functions are required to make the harness. One D-ring interconnects three strap ends, while the other interconnects two strap ends and selectively connects to a metal hook that is in turn connected to a strap that extends from a chock. Such a harness which is designed for use in restraining a large wheel and tire of a larger vehicle is often too large for use on tires for smaller vehicles, thereby requiring the stocking of at least two harnesses of different sizes to handle all tire sizes. An example of this type of harness is shown in U.S. Pat. Nos. 1,279,397, 4,786,223, and 4,836,726.

Another form includes chains, and a combination of chains and formed metal members as in U.S. Pat. No. 2,023,971. U.S. Pat. No. 4,668,140 illustrates a further form which constitutes a single narrow strap overlying the tire, which could easily slip off.

Newer designed cars quite often do not have much room between the tire and the fender, making it difficult to install the prior known harness on the wheel and tire. Also, the use of heavy metal D-rings sometimes causes damage to the cars where mounting procedures may involve contact between the D-rings and the painted portions of the vehicle.

SUMMARY OF THE INVENTION

The cleat and strap assembly of the present invention for use with wheel chocks obviates the difficulties heretofore found in harness assemblies used with chocks by providing a cleat and strap assembly that is capable of being universally used with tires and wheels of different sizes and is easy to install on wheels having even minimal room in the wheel wells between the wheels and the fender structure. Further, the cleat and strap assembly is advantageous as the cleat is made of a copolymer of nylon and an elastomer, giving it high strength characteristics as well as resilient characteristics so that it is easily adaptable and formable for tires of various sizes.

The cleat and strap assembly is also formed so that it reduces the possibility of becoming entangled with any of the supporting or other elements of a wheel, thereby making it easier to be mounted in place and dismounted. Since the cleat is made of a material having a resiliency, it also avoids damage to the paint of the vehicle in the event contact is made between the cleat and the painted surfaces.

The cleat is molded of a nylon block copolymer which would provide the necessary flexibility and resiliency and memory characteristics so that when it is used on smaller tires, it will return to its original shape to thereafter be used on larger tires. The material is a copolymer of nylon and an elastomer and is capable of withstanding severe cold temperatures as well as severe hot temperatures without any adverse affects, while having the toughness of nylon and the impact resistance of an elastomer. A plurality of projections on the tire-engaging side of the cleat prevent slippage and potential disengagement during transit.

It is therefore an object of the present invention to provide a new and improved cleat and strap assembly for wheel chocks that is of more simple and inexpensive construction than the well known harnesses heretofore used.

Another object of the invention is in the provision of a new and improved cleat and strap assembly for wheel chocks which includes a cleat made of a copolymer of nylon and an elastomer, giving it the strength of nylon and the elasticity of an elastomer, so that it may easily be adaptable for use on tires of various sizes and which is formed to tightly engage or grab the tire in a slip-free relationship.

A still further object of the present invention is in the provision of a new and improved cleat and strap assembly for wheel chocks which is easy to install and can be easily installed on vehicles having minimal clearance between the tires and the fender.

A further object of the present invention is in the provision of a one-size cleat and strap assembly for securing a vehicle tire to a floor where the cleat is capable of being formed for effective use on large and small tires and is molded from a plastic material that has a memory characteristic so that it does not become deformed through use.

Another object of the invention is to provide a cleat and strap assembly for use with wheel chocks in a railway car transporting vehicles, where the cleat is carried on the strap and the strap overlies the tire tread with the cleat placed on top of the tire, and the cleat is bendable to form over various tire sizes and formed to produce a slip-free engagement with the tire.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 5 is an enlarged top plan view of the cleat of the present invention in flat configuration;

FIG. 6 is a bottom plan view of the cleat of FIG. 5;

FIG. 7 is a side elevational view of the cleat of FIG. 5;

FIG. 8 is an end elevational view of the cleat of FIG. 5;

FIG. 9 is a greatly enlarged detailed sectional view taken through the cleat substantially along line 9—9 of FIG. 5;

FIG. 10 is an enlarged schematic side elevational view of a wheel illustrating the cleat and harness assembly in position with the cleat shown by itself in flat configuration in solid and in deformed position on the wheel; and FIG. 11 is a greatly enlarged detailed sectional view taken longitudinally through the cleat at openings through which the strap is threaded and particularly illustrating the manner in which the chock strap impinges on the cleat when in flat configuration in solid and the manner in which the impingement decreases when the cleat deforms around the wheel in phantom.

DESCRIPTION OF THE INVENTION

The cleat and harness assembly of the invention is utilized with a pair of wheel chocks that are positioned against opposite sides of a vehicle wheel supported on the floor of a railway car. It will be understood that the chocks are secured to the floor of the vehicle in any suitable manner, such as by connecting them to a rail or track that is mounted on the floor. The rail would extend longitudinally of the car, and the chocks would extend transversely of the rail so as to position a wheel-engaging portion on each side of the wheel.

The cleat and harness assembly of the invention includes a chock strap that is connected at opposite ends to the chocks engaging the wheel and extending in overlying relation to the wheel against the tire tread. Thus, a single strap run is provided in interconnecting relation with the chocks and in overlying relation to the wheel to secure it in place in the railway car.

The harness assembly of the invention includes a wheel cleat threaded on the cock strap to be automatically positioned substantially at the top of the wheel in engagement with the tire tread. It functions to assure the retention of the strap in overlying relation with the wheel to provide the security of avoiding accidental dislodgement of the strap from the wheel. Thus, the integrity of the wheel retraining apparatus is maintained.

The wheel cleat is unique in that it is made from a copolymer of nylon and elastomer so that it enjoys a high-strength characteristic and a resilience to allow it to easily conform to the shape of the wheel when brought down in tight engagement with the tire tread surface of the wheel for securing the wheel to the floor. That the cleat is deformable to positively mate with the tire tread surface, it may be formed of one size to go with a one-size harness for application to restrain wheels of different sizes. The copolymer cleat will spring back to a flat configuration after being used so that thereafter it can be used again whether on a wheel of the same size or of another size, and again deform to the shape of the wheel, even if different from the previous wheel, when bent against the tire tread to provide a radial load on the wheel and harness assembly.

By virtue of the material of which the cleat is made, contact between the cleat and the car finish will not damage the car finish. This contrasts with a cleat that would be made of metal or a hard material that could injure the finish on the car. Also, by virtue of the structure of the cleat and its association with the strap, it may be easily handled by an operator when installing the cleat and harness in place on a wheel or when removing it from a wheel, particularly where limited space is provided between the wheel of the vehicle and the body of the vehicle.

Figure 1:
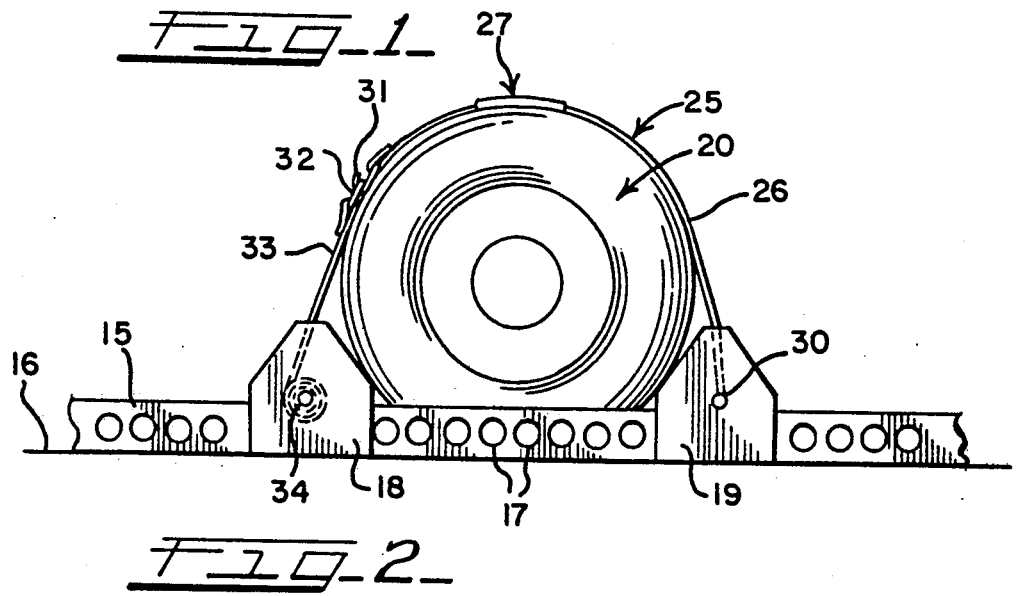
FIG. 1 is a somewhat schematic side elevational view of a vehicle wheel in a railway car secured to the floor with the wheel restraining cleat and harness assembly of the present invention.
Figure 2:
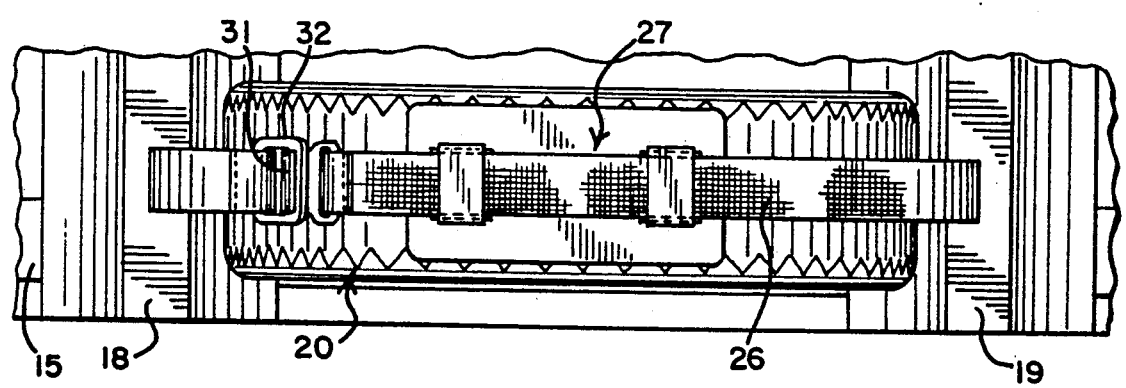
FIG. 2 is a greatly enlarged top plan view of a vehicle wheel and illustrating the positioning of the cleat and harness assembly of the invention on the tire tread.
Figure 3:
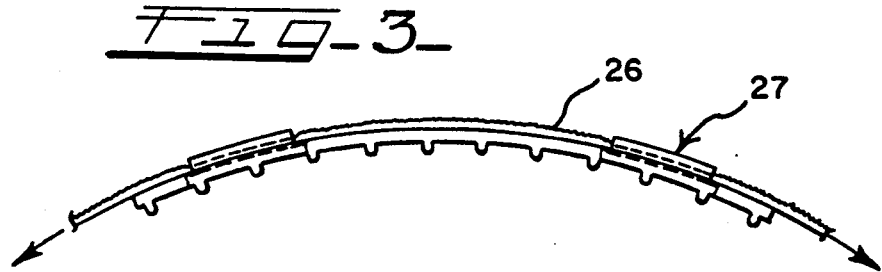
FIG. 3 is a side elevational view of the cleat in bended form as it would be on a tire tread and illustrating in schematic the manner of threading the strap through the cleat.
Figure 4:
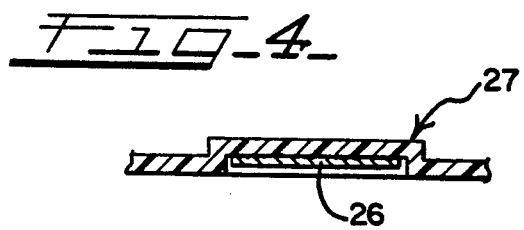
FIG. 4 is an enlarged detailed sectional view taken substantially along line 4—4 of FIG. 2.

Referring now to the drawings and particularly to FIG. 1, a rail or track 15 is shown mounted on a floor 16 of a railway car. The track is provided with a series of spaced apart holes 17 for adjustably securing therealong a pair of chocks 18 and 19 in a suitable manner such as illustrated in the above U.S. Pat. No. 4,836,726, so that the chocks may be brought up against both sides of a wheel 20 of a vehicle that is to be transported by the rail car and which is supported by the floor of the car at one side of the rail. It will be appreciated that the rail will extend longitudinally of the rail car and in a normal fashion the vehicles will be loaded into the car from either end. Normally, a second rail extends at the other side of the vehicle for chocking and tying down wheels. It will also be understood that the vehicles may be in the form of cars or automobiles or trucks. As seen in FIG. 1, the chocks 18 and 19 are brought against the tire of the vehicle wheel at the front and back in a standard chocking relation.

Coacting with the chocks is the harness assembly 25 of the invention for the purpose of securing the wheel to the floor. It will be understood that the wheels would normally include a pneumatic tire as illustrated and, but for the tie-down of the wheel to the floor and preferably at the wheel, the motion and sometimes bumpy ride of a railway car could cause the vehicle to bounce and become disengaged from the chocks and ultimately be damaged from engagement with the sides of the railway car or with respect to striking another vehicle in the car.

Use of chocks and a harness assembly is the most common use today for railway cars, and it therefore becomes important to have a harness assembly that will function substantially in a flawless manner and which can be easily handled to minimize the time needed for securing a vehicle in place in a railway car and which also eliminates the need for stocking different sized harness assemblies for handling vehicle wheels of different sizes. The harness assembly of the present invention therefore solves these problems.

The harness assembly 25 includes a chock strap 26 and a cleat 27 formed of a copolymer of nylon and an elastomer. The strap 26 will be of a standard flexible material such a nylon webbing strap of synthetic material like the type that is used in automobile and airplane seat belts and which is basically non-stretchable, except that it preferably will have a roughened surface formed by the manner in which it is made. This surface enhances the gripping with the cleat when the harness is not being used so as to maintain the position of the cleat on the strap. One end of the strap 26 is fixed to one of the chocks and as illustrated in FIG. 1 fixed to a post or anchoring pin 30 of chock 19. The other end of the strap 26 is provided with a ring 31 engageable with a hook 32 on one end of a strap section 33 that is carried on a rotatable spindle 34 mounted in chock 18 in a usual manner similar or equivalent to the type of system used in above U.S. Pat. No. 4,786,223. It will be appreciated that the hook and ring is optional as it may be omitted, but it provides an advantage for quick connect and disconnect where desired. Further, while the one end of the chock strap is shown connected to a pin, it could be likewise connected to a rotatable spindle if provided in that chock. When mounting the chock strap and harness on a wheel after interconnecting the ring and hook, a tension is applied to the strap by actuation of the spindle 34 in the usual manner.

The cleat 27, as seen particularly in FIGS. 5 to 9, is a one-piece molded unit generally rectangular in form and including a pair of spaced openings 36 and 37 along its longitudinal axis and generally centered. The top side 38 of the cleat is generally smooth, while the bottom side 39 is provided with a plurality of projections 40 in an array of columns and rows which would engage the tire tread 41 of the wheel.

Bars or strap retaining portions 44 and 45 coact with the openings 36 and 37 to define strap holes 44a, 44b, 45a and 45b, respectively, for purposes of threading the strap through the cleat and making the cleat and strap a part of the harness assembly which coact to secure the vehicle wheel in place. While it is preferred that the bars 44 and 45 are part of a one-piece cleat when molded altogether to provide an integral structure, it should be appreciated that the bars could be separately formed and suitably fastened in place to provide an integral structure.

The cleat is molded of a nylon block copolymer NYRIM (a trademark of DSM Rim Nylon Inc. of Augusta, Ga.). Being a copolymer of nylon and an elastomer, the cleat has the toughness of nylon and the impact resistance of an elastomer. It has a memory characteristic so that after being deformed it can spring back substantially to its original form which is a flat configuration. While the cleat of the invention is preferably formed of this material, it can be appreciated that it can be formed of other plastic materials having high-strength and elastomeric characteristics.

As seen most clearly in FIGS. 5 to 11, the bars 44 and 45 include an undersurface, such as 45c illustrated in FIG. 9, which is spaced slightly above the top surface 38 of the cleat. This is also illustrated with respect to the undersurface 44c of bar 44 in FIG. 11. Additionally, as shown in FIG. 11, when the chock strap 26 is threaded through the holes 44a and 44b, the thickness of the strap is such as is the position of the bar 44 to cause the chock strap to impinge on the edges 44d and 44e of the bar 44. The chock strap will similarly coact with the bar 45. This impingement is at one level when the cleat is in flat configuration as illustrated in solid lines in FIG. 11 and of a different level when the cleat is deformed to the surface of the tire tread, as shown in dotted lines. Impingement is greater when the cleat is in flat configuration in order to provide a greater frictional engagement between the cleat and the strap and inhibit sliding movement of the cleat along the strap when it is not being used. This facilitates use of the harness and diminishes the need to continually adjust the position of the cleat on the strap when mounting the harness on a vehicle wheel. Thus, when the harness is stored, the cleat will maintain its position along the strap.

Bending of the flexible cleat to conform to the surface of the wheel and particularly the tire tread surface will take place when tension is applied to the strap by the wheel chocks. Impingement between the strap and cleat at the edges of the bar members is decreased when bending the cleat to conform to the tire tread so that the strap is released from the cleat and the tensional loads on the strap are easily equalized on both ends of the cleat. Those portions of the cleat on opposite sides of the bars move away from the undersurfaces of the bars to decrease impingement. As particularly noted in FIG. 11, the position and relationship of the bar 44 to the opening in the cleat allows the strap room so that when a radial load is applied to the harness, the strap will not engage the tire tread. As the chock strap is tightened, a radial load will develop between the strap cleat and tire tread of the wheel. This radial load will force those cleat projections 40, unsupported by the tire tread by being aligned with grooves in the tire tread, to enter into the grooves. With respect to those projections that are supported or engaged by the outer surface of the tire tread, they will generally flatten. Accordingly, the engagement of the cleat with respect to the tire tread is firm so that it will maintain the chock strap in essentially slip-free relation with the wheel. This is particularly a material advantage over a stiff or non-flexible cleat. For example, a metal cleat would need to be small with a high unit pressure in a radial direction that would most likely cut or damage the tire tread. A non-flexible plastic cleat would either break or be likely to slip off the tire tread.

Both FIGS. 10 and 11 illustrate the manner in which the cleat will transform from a flat configuration to a different configuration in concert with the shape of the entire wheel. While the cleat is rectangular in shape, it will be appreciated that it could be circular, oval or of other polygonal shape. Further, while it is appreciated that the cleat is made with a pair of strap interconnections so that it is threaded through two sets of openings, it could be made with a single set of openings. In any case, it is important that it be made of a flexible copolymer of nylon and an elastomer to not only withstand the hard use encountered in railway cars but to enable it to efficiently and easily be used with a strap in a harness apparatus for securing vehicle wheels to the floor of a railway vehicle. It may be further appreciated that while the harness assembly is shown in combination with a pair of chocks which would be the preferred way that it would be used, it could be used with other tie-down systems which would have tie-down elements mounted at or in the floor of a railway car.

It will be understood that modifications and variations may be effected without departing from the scope of the novel concepts of the present invention, but it is understood that this application is to be limited only by the scope of the appended claims.

The invention is hereby claimed as follows:

1. A wheel harness for use in a vehicle hold down apparatus in a railway car to secure a vehicle wheel having a pneumatic tire to the floor of the car, wherein a chock is secured to the floor at each side of the tire tread, and the harness is connected to the chocks, said harness including strap means of flexible, substantially non-stretchable material substantially circumferentially overlying the tire tread and connected to the chocks, and a substantially plate-like cleat carried on the strap and disposed on and substantially at the top of the tire tread, said cleat being molded of plastic having high strength and resilient characteristics, said resilient characteristics allowing the cleat to conform to the contour of the tire tread, said cleat having openings through which the strap is threaded, and projections on the tire contacting surface which produce a slip-free engagement with the tire tread when the strap is tightened.

2. The cleat of claim 1, wherein the cleat is made of a copolymer of nylon and an elastomer.

3. The cleat of claim 1, wherein the cleat is made of a copolymer RIM type material in a flat configuration.

4. The cleat of claim 1, wherein the openings coact with the strap to frictionally engage the strap when the cleat is in a flat and non-loaded position.

5. The cleat of claim 4, wherein the cleat is of flat configuration when not bent over a tire tread surface and includes a pair of spaced strap holes defined by an opening in the cleat and a bar-shaped portion on the non-tread engaging side and over the opening sized to define the spaced holes and arranged so that when the strap is threaded through the openings and under the bar-shaped portion a bend is formed in the strap at each opening which defines a friction engagement to inhibit sliding of the cleat on the strap when the cleat is in flat configuration, and which friction engagement decreases when the cleat bends over the tire tread to permit equalization of the tensional loads on the strap at both ends of the cleat.

6. A vehicle hold-down apparatus for securing a vehicle to a floor by chocking and harnessing one or more tires of the vehicle, said apparatus including first and second chock means fixed to the floor and arranged on opposite sides of the tread of the tire, and a harness arranged in overlying relation to the tire and connected at opposite ends to said first and second chock means, said harness comprising strap means substantially circumferentially overlying the tire tread and connected to said first and second chock means, and a cleat having openings through which the strap is threaded to interconnect the cleat and strap, said cleat being of high-strength elastomeric material, said cleat having a resilience such as to be formable to the tread surface of the tire and returning to normal after use, and means on the tread engaging surface to produce a slip-free engagement when under load.

7. A wheel harness for securing a vehicle wheel having a tire to the floor of a railway car comprising strap means arranged in substantially circumferentially overlying relation to the wheel and against the tire tread, the strap being secured at opposite ends to the floor, and a substantially pad-shaped cleat molded of a copolymer of nylon and an elastomer to have high strength and elastomeric characteristics, said cleat having a width greater than the strap and having openings through which the strap is threaded to interconnect the cleat to the strap such that when tightly engaging the wheel the cleat will function to engage and conform to the tire in a slip-free relation to prevent the strap from slipping off the wheel, and the wheel-engaging side of the cleat having projections, some of which will enter the grooves of the tire tread and other of which will substantially flatten against the tire tread.

8. The harness of claim 7, wherein the cleat includes at least one set of strap holes for threading the cleat on the strap.

9. The harness of claim 8, wherein the cleat at the strap holes includes means that coacts with the strap to inhibit sliding of the cleat along the strap when the cleat is being stored in a flat configuration and which will allow the strap to tensionally equalize on the cleat when the cleat is deformed into mating engagement with the tire tread.

10. The harness of claim 8, wherein the cleat is rectangular.

11. The harness of claim 8, wherein the cleat includes a plurality of sets of strap holes.

* * * * *